Sept. 8, 1925.                          1,553,122
B. D. THOMAS
AIRPLANE
Filed March 29, 1922
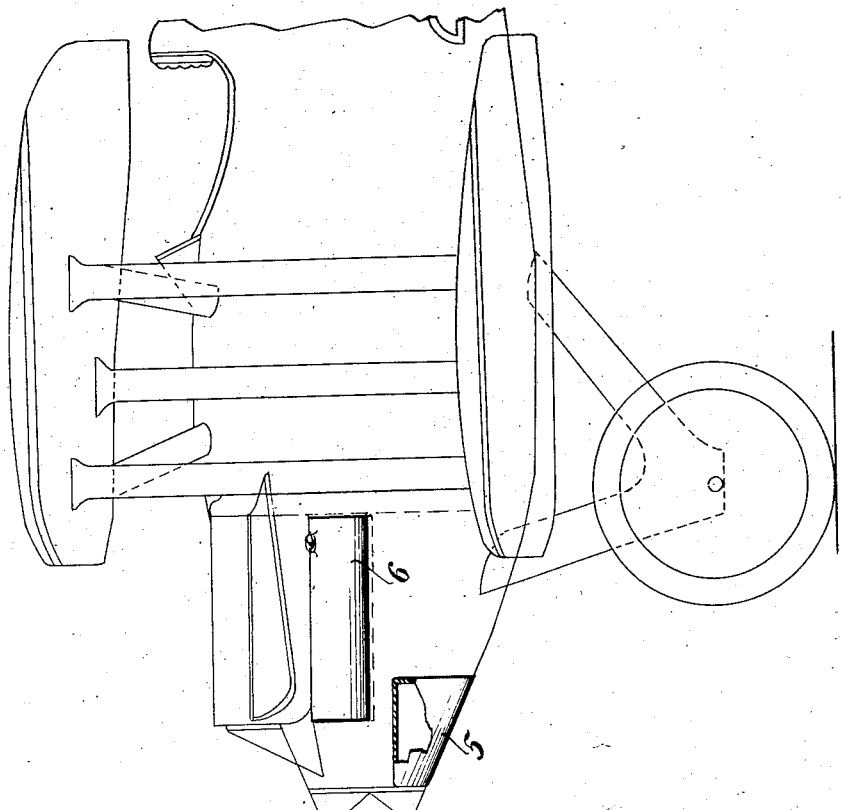
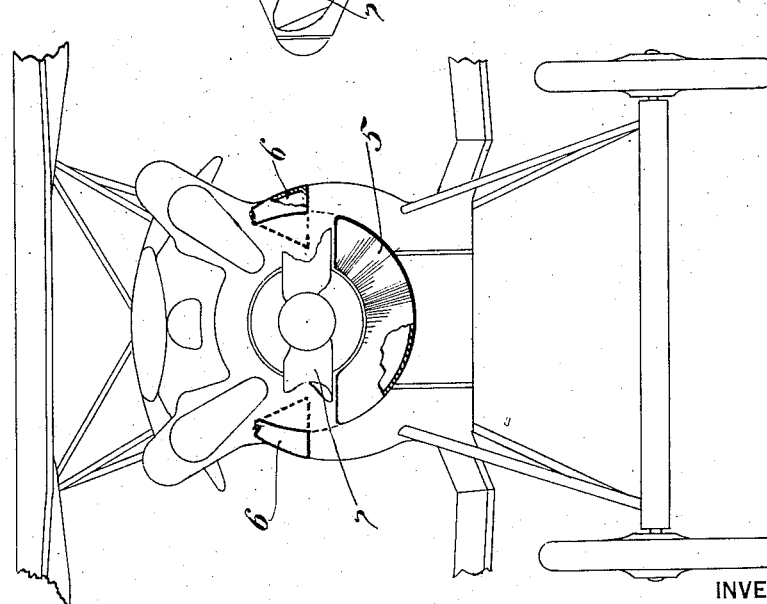
INVENTOR
Benjamin Douglas Thomas
BY   ATTORNEY
Edward H. Wright Patented Sept. 8, 1925.

1,553,122

UNITED STATES PATENT OFFICE.

BENJAMIN DOUGLAS THOMAS, OF ITHACA, NEW YORK, ASSIGNOR OF ONE-TENTH TO THOMAS-MORSE AIRCRAFT CORPORATION, OF ITHACA, NEW YORK, A CORPORATION OF NEW YORK.

AIRPLANE.

Application filed March 29, 1922. Serial No. 547,606.

*To all whom it may concern:*

Be it known that I, BENJAMIN DOUGLAS THOMAS, a subject of the King of Great Britain, and a resident of Ithaca, in the county of Tompkins and State of New York, have invented a certain new and useful Improvement in Airplanes, of which improvement the following is a specification.

This invention relates to airplanes, and has particular reference to the location and shape of tanks carried thereby. On account of the exceedingly limited space available for storage, it is important to make use of unoccupied places, and one of the objects of my invention is to utilize the space within the nose cowling of the airplane for one or more such tanks. The tank or tanks in this case may be formed with outer convex surfaces to conform to the tapered contour or conical form of the nose of the airplane and thereby not only economize space, but also form a part of the cowling and obtain the advantage of cooling the tank or tanks by the air stream from the propeller.

In the accompanying drawing: Figure 1 is a front elevation of an airplane embodying my invention; and, Fig. 2, a side elevation of the same.

According to the construction shown, the tank, 5, is formed of a substantially segmental annular shape with an outer convex surface corresponding with the substantially conical surface or contour of the nose of the airplane body, and inserted symmetrically at the bottom of the nose portion, just at the rear of the propeller, 7. In this position the tank occupies space hereto unused, and its outer surface comprises a portion of the nose cowling of the machine. Its contents will also be cooled by the air stream from the propeller.

Other tanks, such as 6, may be inserted in the nose portion at either side of the fuselage, and may rest upon the engine bearers of the machine, or be secured in position by suitable straps. These tanks also have their outer surfaces conform to the flaring shape of the nose cowling of the fuselage, and constitute a part thereof.

Having now described my invention, what I claim as new and desire to secure by Letters Patent is:

1. In an airplane, an oil tank located in the lower front part of the nose portion of the fuselage, said tank being of segmental shape to conform to the contour of the cowling, with its lower wall forming part of said cowling and having a portion of its upper surface concave.

2. In an airplane, an oil tank, the bottom wall of which constitutes a part of the nose cowling, and having plane end walls and a concave upper wall.

3. In an airplane, a tank located in the nose portion of the fuselage and having one of its walls convex and constituting a part of the cowling, its opposite wall being concave and its front end wall a plane surface directly exposed to the air stream from the propeller.

In testimony whereof I have hereunto set my hand.

BENJAMIN DOUGLAS THOMAS.